United States Patent
Ushioda et al.

(10) Patent No.: US 6,344,528 B1
(45) Date of Patent: Feb. 5, 2002

(54) CATALYST FOR OLEFIN (CO) POLYMERIZATION AND PROCESS FOR THE PRODUCTION OF OLEFIN (CO) POLYMERS

(75) Inventors: Tsutomu Ushioda, Ichihara; Jun Saito, Kimitsu; Mototake Tsutsui, Ichihara, all of (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 09/655,395

(22) Filed: Sep. 5, 2000

Related U.S. Application Data

(62) Division of application No. 09/253,510, filed on Feb. 22, 1999, now abandoned.

(30) Foreign Application Priority Data

Feb. 27, 1998 (JP) ............................................. 10-048252
Feb. 27, 1998 (JP) ............................................. 10-048253

(51) Int. Cl.[7] ................................................. C08F 4/14
(52) U.S. Cl. ........................ 526/114; 502/113; 502/103; 502/117; 502/154; 502/153; 526/348.6; 526/943; 526/113; 526/348.5; 526/348.2
(58) Field of Search ................................. 502/113, 103, 502/117, 153, 154; 526/113, 348.2, 114, 348.5, 348.6, 943

(56) References Cited

U.S. PATENT DOCUMENTS 4,994,534 A * 2/1991 Rhee et al.
5,304,588 A * 4/1994 Boysen et al.
5,627,117 A * 5/1997 Mukaiyama et al.

FOREIGN PATENT DOCUMENTS

| JP | 7-233210 | | 9/1995 |
| JP | 7-233211 | | 9/1995 |
| JP | 7-233212 | | 9/1995 |
| WO | WO-96/00245 | * | 1/1996 |
| WO | 96/00245 | | 1/1996 |

OTHER PUBLICATIONS

"Gas–Phase Polymerization" by Herman F. Mark et al., Encyclopedia of Polymer Science and Engineering, vol. 7, 2nd Edition (Jun. 1987), pp. 480–488.

"Synthesis and Catalytic Properties of Ansa–Binuclear Metallocenes of the Group IV Transition Metals" by T. Ushioda et al., Journal of Organometallic Chemistry, 518 (1996), pp. 155–166.

* cited by examiner

Primary Examiner—David W. Wu
Assistant Examiner—William K Cheung
(74) Attorney, Agent, or Firm—McDermott, Will & Emery

(57) ABSTRACT

To provide a catalyst for olefin (co)polymerization which shows a high polymerization activity and which can produce olefin (co)polymers having a high molecular weight and a narrow molecular weight distribution; the catalyst for olefin (co)polymerization is rendered a carried type catalyst comprising a transition metal compound represented by general formula (I) or (II) and aluminoxane carried on a fine particulate carrier.

2 Claims, No Drawings

CATALYST FOR OLEFIN (CO) POLYMERIZATION AND PROCESS FOR THE PRODUCTION OF OLEFIN (CO) POLYMERS

This application is a Divisional of Application Ser. No. 09/253,510 filed Feb. 22, 1999.

FIELD OF THE INVENTION

The present invention relates to a catalyst for olefin (co)polymerization and to a process for the production of olefin (co)polymers. More particularly, the present invention relates to a catalyst for olefin (co)polymerization which has high polymerization activity and can produce olefin (co) polymers having a high molecular weight and a narrow molecular weight distribution and to a process for the production of olefin (co)polymers using the same.

By the term "(co)polymerization" as used herein is meant copolymerization or polymerization.

BACKGROUND OF THE INVENTION

Olefin polymers and copolymers such as polypropylene and polyethylene are excellent in mechanical properties and resistance to chemicals and very useful in view of well balanced economic advantages so that they are used widely in various plastic article fields. The olefin (co)polymers have hitherto been produced by (co)polymerization of olefins using a so-called Ziegler-Natta catalyst, which comprises a transition metal catalyst component, examples of which include titanium trichloride, titanium tetrachloride, and a carrier such as magnesium chloride carrying at least one above described titanium chlorides thereon, and an organoaluminum compound in combination.

On the other hand, in recent years, use of a catalyst which comprises a combination of metallocene and aluminoxane, different than conventional catalyst systems, in (co) polymerization of olefins gives olefin (co)polymers and the olefin (co)polymers obtained with the metallocene series catalyst have a narrow molecular weight distribution and in the case of copolymers comonomers are copolymerized uniformly; hence, it is known that more uniform olefin (co)polymers are obtained.

However, as described in Eur. Polym. J., 32, 331 (1966), the olefin (co)polymers obtained with metallocene catalysts have a low molecular weight and from practical reasons, catalyst for olefin (co)polymerization which can provide olefin (co)polymers having a higher molecular weight are desired.

Japanese Patent Application Laid-open Nos. 7-233210, 7-233211 and 7-233212 describe that the use of metallocene catalysts containing two or more kinds of transition metals gives rise to high molecular weight polymers. In this case, however, there is a problem that a plurality kinds of active species participate in polymerization of polymers with different molecular weights, so that the molecular weight distribution becomes broader and it is difficult to obtain homogeneous olefin (co)polymers.

SUMMARY OF THE INVENTION

The present invention has been made in view of the above and an object of the present invention is to provide a catalyst for olefin (co)polymerization which shows high polymerization activity and which can produce olefin (co)polymers having a high molecular weight and a narrow molecular weight distribution and a process for producing olefin (co) polymers using the same. More particularly, an object of the present invention is to provide a catalyst which can produce copolymers of ethylene and 1-hexene having a high molecular weight and a narrow molecular weight distribution and a process for producing copolymers of ethylene and 1-hexene using the same.

As a result of intensive investigation with view to achieving the above object, the present inventors have found that (co)polymerization of olefins with a metallocene compound having a specified structure and aluminoxane carried together on a fine particulate carrier as a catalyst in the presence of an organoaluminum compound gives rise to olefin (co)polymers having a high molecular weight and a narrow molecular weight distribution, thus completing the present invention.

That is, the present invention is to provide a catalyst for olefin (co)polymerization comprising a transition metal compound represented by general formula (I) or (II) below and aluminoxane carried on a fine particulate carrier.

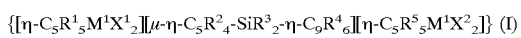

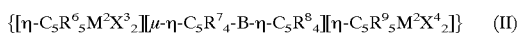

[In formulae (I) and (II) above, $\eta\text{-}C_5R^1{}_5$, $\eta\text{-}C_5R^2{}_4$, $\eta\text{-}C_5R^5{}_5$, $\eta\text{-}C_5R^6{}_5$, $\eta\text{-}C_5R^7{}_4$, $\eta\text{-}C_5R^8{}_4$, and $\eta\text{-}C_5R^9{}_5$ represent substituted cyclopentadienyl groups, respectively. Each of $R^1$, $R^2$, $R^5$, $R^6$, $R^7$, $R^8$, and $R^9$ independently represents a hydrogen atom or a hydrocarbon group having 1 to 20 carbon atoms which may contain a silicon atom, all $R^1$s, $R^2$s, $R^5$s, $R^6$s, $R^7$s, $R^8$s, and $R^9$s may be the same or different, respectively, and any two adjacent $R^1$s, $R^2$s, $R^5$s, $R^6$s, $R^7$s, $R^8$s, and $R^9$s may combine to form at least one hydrocarbon ring which may contain a silicon atom around the cyclopentadienyl ring, respectively.

In formula (I) above, $\eta\text{-}C_9R^4{}_6$ represents a substituted indenyl group. $R^4$ represents a hydrogen atom or a hydrocarbon group having 1 to 20 carbon atoms which may contain a silicon atom, all $R^4$s may be the same or different, and any two adjacent $R^4$s may combine to form at least one hydrocarbon ring which may contain a silicon atom around the indenyl ring. $SiR^3{}_2$ is a crosslinking group and $R^3$ is a hydrocarbon group having 1 to 20 carbon atoms.

In formula (II) above, B is a crosslinking group consisting of a hydrocarbon containing a silicon atom, its backbone chain containing at least one silicon atom and its chain length being 2 to 20 atoms.

In formulae (I) and (II) above, $M^1$ and $M^2$ represent transition metals selected from the group consisting of titanium, zirconium and hafnium, respectively.

Further, in formula (I) above, each of $X^1$ and $X^2$ independently and, in formula (II) above, each of $X^3$ and $X^4$ independently represents a hydrogen atom, a halogen atom or a hydrocarbon group having 1 to 20 carbon atoms.]

The present invention is also to provide a catalyst for copolymerization of ethylene and 1-hexene comprising a transition metal compound represented by general formula (I) or (II) above and aluminoxane carried on a fine particulate carrier.

Further, the present invention is to provide a process for olefin (co)polymerization by (co)polymerizing olefins in the presence of a catalyst and an organoaluminum compound, in which the catalyst is a catalyst comprising a transition metal compound represented by general formula (I) or (II) above and aluminoxane carried on a fine particulate carrier.

Further more, the present invention is to provide a process for polymerization of ethylene and 1-hexene by copolymerizing ethylene and 1-hexene in the presence of a catalyst and an organoaluminum compound, in which the catalyst is a catalyst comprising a transition metal compound represented by general formula (I) or (II) above and aluminoxane carried on a fine particulate carrier.

The catalyst for olefin (co)polymerization as described above shows a high polymerization activity in the production of olefin (co)polymers and the process for producing olefin (co)polymers using it can give olefin (co)polymers having a high molecular weight and a narrow molecular weight distribution.

DETAILED DESCRIPTION OF THE INVENTION

Hereafter, the present invention will be described in more detail. First, explanation will be made on the catalyst for olefin (co)polymerization of the present invention.

(1) Catalyst for Olefin (co)polymerization of the Present Invention

The catalyst for olefin (co)polymerization of the present invention is a carried type catalyst comprising a transition metal compound represented by general formula (I) or (II) above and aluminoxane carried on a fine particulate carrier.

The transition metal compound represented by general formula (I) above used in the catalyst for olefin (co) polymerization of the present invention is not limited particularly so far as it is a metallocene compound represented by general formula (I) above, but examples of the above transition metal compound preferably include the following compounds.

$\{[\eta\text{-}C_5H_5ZrCl_2][\mu\text{-}\eta\text{-}C_5H_4\text{—}SiMe_2\text{-}\eta\text{-}C_9H_6][\eta\text{-}C_5H_5ZrCl_2]\}$, $\{[\eta\text{-}C_5H_4MeZrCl_2][\mu\text{-}\eta\text{-}C_5H_4\text{—}SiMe_2\text{-}\eta\text{-}C_9H_6][\eta\text{-}C_5H_4MeZrCl_2]\}$, $\{[\eta\text{-}C_5H_4(n\text{-}Bu)ZrCl_2][\mu\text{-}\eta\text{-}C_5H_4\text{—}SiMe_2\text{-}\eta\text{-}C_9H_6][\eta\text{-}C_5H_4(n\text{-}Bu)ZrCl_2]\}$, $\{[\eta\text{-}1,3\text{-}Me_2C_5H_3ZrCl_2][\mu\text{-}\eta\text{-}C_5H_4\text{—}SiMe_2\text{-}\eta\text{-}C_9H_6][\eta\text{-}1,3\text{-}Me_2C_5H_3ZrCl_2]\}$, $\{[(\eta\text{-}1\text{-}Me\text{-}3\text{-}n\text{-}BuC_5H_3ZrCl_2[\mu\text{-}\eta\text{-}C_5H_4\text{—}SiMe_2\text{-}\eta\text{-}C_9H_6][\eta\text{-}1\text{-}Me\text{-}3\text{-}n\text{-}BuC_5H_3ZrCl_2]\}$, $\{[\eta\text{-}1,2,4\text{-}Me_3C_5H_2ZrCl_2][\mu\text{-}\eta\text{-}C_5H_4\text{—}SiMe_2\text{-}\eta\text{-}C_9H_6][\eta\text{-}1,2,4\text{-}Me_3C_5H_2ZrCl_2]\}$, $\{[\eta\text{-}C_5Me_5ZrCl_2][\mu\text{-}\eta\text{-}C_5H_4\text{—}SiMe_2\text{-}\eta\text{-}C_9H_6][\eta\text{-}C_5Me_5ZrCl_2]\}$, $\{[\eta C_5H_5ZrCl_2][\mu\text{-}\eta\text{-}C_9H_6\text{—}SiMe_2\text{-}\eta\text{-}C_9H_6][\eta\text{-}C_5H_5ZrCl_2]\}$, In each of the above compounds, $\eta\text{-}C_9H_6$ represents a indenyl group. As the metallocene compound represented by general formula (I) above used in the present invention, there can be cited those compounds in which one or more hydrogen atoms on the cyclopentadienyl group and indenyl group independently are replaced with hydrocarbon groups having 1 to 20 carbon atoms which may contain a silicon atom.

Also, the transition metal compound represented by general formula (II) above used in the catalyst for olefin (co)polymerization of the present invention is not limited particularly so far as it is a metallocene compound represented by general formula (II) above, but examples of the above transition metal compound preferably include the following compounds.

$\{[\eta\text{-}C_5H_5ZrCl_2][\mu\text{-}\eta\text{-}C_5H_4\text{—}SiMe_2\text{—}CH_2\text{—}CH_2\text{—}SiMe_2\text{-}\eta\text{-}C_5H_4][\eta\text{-}C_5H_5ZrCl_2]\}$, $\{[\eta\text{-}C_9H_7ZrCl_2][\mu\text{-}\eta\text{-}C_5H_4\text{—}SiMe_2\text{—}CH_2\text{—}CH_2\text{—}SiMe_2\text{-}\eta\text{-}C_5H_4][\eta\text{-}C_5H_5ZrCl_2]\}$, $\{[\eta\text{-}C_9H_7ZrCl_2][\mu\text{-}\eta\text{-}C_5H_4\text{—}SiMe_2\text{—}CH_2\text{—}CH_2\text{—}SiMe_2\text{-}\eta\text{-}C_5H_4][\eta\text{-}C_9H_7ZrCl_2]\}$, $\{[\eta\text{-}C_5H_5ZrCl_2][\mu\text{-}\eta\text{-}C_9H_6\text{—}SiMe_2\text{—}CH_2\text{—}CH_2\text{—}SiMe_2\text{-}\eta\text{-}C_5H_4][\eta\text{-}C_5H_5ZrCl_2]\}$, $\{[\eta\text{-}C_5H_5ZrCl_2][\mu\text{-}\eta\text{-}C_9H_6\text{—}SiMe_2\text{—}CH_2\text{—}CH_2\text{—}SiMe_2\text{-}\eta\text{-}C_9H_6][\eta\text{-}C_5H_5ZrCl_2]\}$, $\{[\eta\text{-}C_9H_7ZrCl_2][\mu\text{-}\eta\text{-}C_9H_6\text{—}SiMe_2\text{—}CH_2\text{—}CH_2\text{—}SiMe_2\text{-}\eta\text{-}C_9H_6][\eta\text{-}C_5H_5ZrCl_2]\}$, $\{[\eta\text{-}C_9H_7ZrCl_2][\mu\text{-}\eta\text{-}C_9H_6\text{—}SiMe_2\text{—}CH_2\text{—}CH_2\text{—}SiMe_2\text{-}\eta\text{-}C_9H_6][\eta\text{-}C_9H_7ZrCl_2]\}$, $\{[\eta\text{-}C_5H_5ZrCl_2][\mu\text{-}\eta\text{-}C_5H_4\text{—}SiMe_2\text{—}SiMe_2\text{-}\eta\text{-}C_5H_4][\eta\text{-}C_5H_5ZrCl_2]\}$, $\{[\eta\text{-}C_9H_7ZrCl_2][\mu\text{-}\eta\text{-}C_5H_4\text{—}SiMe_2\text{—}SiMe_2\text{-}\eta\text{-}C_5H_4][\eta\text{-}C_5H_5ZrCl_2]\}$, $\{[\eta C_9H_7ZrCl_2][\mu\text{-}\eta\text{-}C_5H_4\text{—}SiMe_2\text{—}SiMe_2\text{-}\eta\text{-}C_5H_4][\eta\text{-}C_9H_7ZrCl_2]\}$, $\{[\eta\text{-}C_5H_5ZrCl_2][\mu\text{-}\eta\text{-}C_9H_6\text{—}SiMe_2\text{—}SiMe_2\text{-}\eta\text{-}C_5H_4][\eta\text{-}C_5H_5ZrCl_2]\}$, $\{[\eta\text{-}C_5H_5ZrCl_2][\mu\text{-}\eta\text{-}C_9H_6\text{—}SiMe_2\text{—}SiMe_2\text{-}\eta\text{-}C_9H_6][\eta\text{-}C_5H_5ZrCl_2]\}$, $\{[\eta\text{-}C_9H_7ZrCl_2][\mu\text{-}\eta\text{-}C_9H_6\text{—}SiMe_2\text{—}SiMe_2\text{-}\eta\text{-}C_9H_6][\eta\text{-}C_5H_5ZrCl_2]\}$, $\{[\eta\text{-}C_9H_7ZrCl_2][\mu\text{-}\eta\text{-}C_9H_6\text{—}SiMe_2\text{—}SiMe_2\text{-}\eta\text{-}C_9H_6][\eta\text{-}C_9H_7ZrCl_2]\}$, In each of the above compounds, $\eta\text{-}C_9H_7$ and $\eta\text{-}C_9H_6$ represent indenyl groups. As the metallocene compound represented by general formula (II) above used in the present invention, there can be also cited those compounds in which one or more hydrogen atoms on the cyclopentadienyl group and indenyl group independently are replaced with hydrocarbon groups having 1 to 20 carbon atoms which may contain a silicon atom.

The metallocene compounds represented by general formula (I) or (II) above used in the catalyst of the present invention can be synthesized with ease by conventional processes which are described in J. Organomet. Chem., 518, 155–166 (1996), and the like.

For example, of the metallocene compounds represented by general formula (I) above, $\{[\eta\text{-}C_5H_5ZrCl_2][\mu\text{-}\eta\text{-}C_5H_4\text{—}SiMe_2\text{-}\eta\text{-}C_9H_6][\eta\text{-}C_5H_5ZrCl_2]\}$ can be obtained by adding $Li_2[SiMe_2(C_5H_4)(C_9H_6)].0.6Et_2O$ and $[Zr(\eta\text{-}C_5H_5)Cl_3].DME$ in appropriate proportions to an organic solvent such as toluene, mixing and refluxing for a suitable time, then removing impurities from the reaction mixture by filtration or the like, distilling off the organic solvent, and recrystallizing the resulting solid using dichloromethane/pentane mixture or the like.

The $Li_2[SiMe_2(C_5H_4)(C_9H_6)]$. $0.6Et_2O$ used as a starting material for synthesizing the metallocene compound can be prepared by the method described in New. J. Chem. 14, 499 (1990), more specifically, by reacting dimethyldichlorosilane with one equivalent of lithium indenyl and further with one equivalent of sodium cyclopentadienyl and then reacting the reaction product with n-butyllithium in diethyl ether.

The $[Zr(\eta\text{-}C_5H_5)Cl_3]$. DME used as a starting material as described above can be prepared by the method described in Organometallics, 9, 2426 (1990), more specifically, by reacting zirconium tetrachloride suspended in methylene chloride with dimethyl sulphur, adding trimethylcyclopentadienylsilane which is obtained by reacting separately cyclopentadinenyl sodium with chlorotrimethylsilane to the reaction mixture, and then adding 1,2-dimethoxyethane thereto.

Further, among the metallocene compounds represented by general formula (I) above, $\{[\eta\text{-}C_5H_5ZrCl_2][\mu\text{-}\eta\text{-}C_9H_6\text{—}SiMe_2\text{-}\eta\text{-}C_9H_6][\eta\text{-}C_5H_5ZrCl_2]\}$ can be obtained as a racemi form by adding $Li_2[SiMe_2(C_9H_6)_2]$. $0.5Et_2O$ and $[Zr(\eta\text{-}C_5H_5)Cl_3]$. DME in appropriate proportions to an organic solvent such as toluene, mixing and refluxing for a suitable time, then removing impurities from the reaction mixture by filtration or the like, distilling off the organic solvent, extracting the resulting solids with an extraction solvent such as toluene at an appropriate temperature, and then distilling off the extraction solvent.

The $Li_2[SiMe_2(C_9H_6)_2] \cdot 0.5Et_2O$ used as a starting material for synthesizing the metallocene compound can be prepared by the method described in Orgnometallics, 12, 4607 (1993), more specifically, by reacting dimethyldichlorosilane with two equivalents of lithium indenyl and reacting the resulting reaction product with n-butyllithium in diethyl ether. Also, the $[Zr(\eta-C_5H_5)Cl_3] \cdot DME$ can be prepared by the method described in Organometallics, 9, 2426 (1990) in the same manner as described above.

Also, among the metallocene compounds represented by general formula (II) above, $\{[\eta-C_5H_5ZrCl_2][\mu-\eta-C_5H_4-SiMe_2-CH_2-CH_2-SiMe_2-\eta-C_5H_4][\eta-C_5H_5ZrCl_2]\}$ and obtained by adding $Li_2[SiMe_2CH_2CH_2SiMe_2(C_5H_4)_2]$ and $[Zr(\eta-C_5H_5)Cl_3] \cdot DME$ in appropriate proportions to an organic solvent such as toluene, mixing and refluxing for a suitable time, then removing impurities from the reaction mixture by filtration or the like, distilling off the organic solvent, extracting the resulting solids with an extraction solvent such as dichloromethane, and then distilling off the extraction solvent.

Here, the $Li_2[SiMe_2CH_2CH_2SiMe_2(C_5H_4)_2]$ used as a starting material for synthesizing the metallocene compound can be prepared by the method described in Orgnometallics, 10, 347 (1991), more specifically, by reacting $Cl-SiMe_2CH_2CH_2SiMe_2-Cl$ with 2 equivalents of cyclopentadienyl sodium and reacting the resulting reaction product with n-butyllithium. Also, the $[Zr(\eta-C_5H_5)Cl_3] \cdot DME$ can be prepared by the method described in Organometallics, 9, 2426 (1990) in the same manner as described above.

For the metallocene compounds represented by general formula (I) or (II) above within the scope of the present invention other than those metallocene compounds of which details of the production process have been shown above, their production process is similarly well known by one having ordinary skill in the art and can be produced by the conventional processes.

The aluminoxane used in the catalyst for olefin (co) polymerization of the present invention is not limited particularly so far as it is aluminoxane which has catalytic activity for catalyzing olefin (co)polymerization when used together with the metallocene compound represented by formula (I) or (II) above and, for example, it includes organoaluminum compounds represented by general formula (III) or (IV) below.

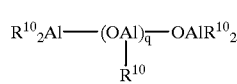

(III)

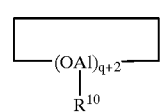

(IV)

Here, in formulae (III) and (IV) above, $R^{10}$ represents a hydrocarbon group having 1 to 6 carbon atoms, preferably 1 to 4 carbon atoms, and more specifically an alkyl group such as a methyl group, an ethyl group, a propyl group, a butyl group, an isobutyl group, a pentyl group, and a hexyl group; an alkenyl group such as an allyl group, a 2-methylallyl group, a propenyl group, an isopropenyl group, a 2-methyl-1-propenyl group, and a butenyl group; a cycloalkyl group such as a cyclopropyl group, a cyclobutyl group, a cyclopentyl group, and a cyclohexyl group; an aryl group; and the like. Among these, an alkyl group is preferred and each $R^{10}$ may be the same or different.

In formula (III) or (IV) above, q is an integer of 4 to 30, preferably 6 to 30, and particularly preferably 8 to 30.

The aluminoxane can be prepared under various known conditions and specifically the following production processes can be cited.

(1) A process in which trialkylaluminum is reacted directly with water using an organic solvent such as toluene, ether, and the like.

(2) A process in which trialkylaluminum is reacted with a salt having crystal water, for example, copper sulfate hydrate or aluminum sulfate hydrate.

(3) A process in which trialkylaluminum is reacted with moisture impregnated in silica gel or the like.

(4) A process in which trimethylaluminum and triisobutylaluminum are mixed and the mixture is reacted directly with water using an organic solvent such as toluene, ether, and the like.

(5) A process in which trimethylaluminum and triisobutylaluminum are mixed and the mixture is reacted with a salt having crystal water, for example, copper sulfate hydrate or aluminum sulfate hydrate.

(6) A process in which silica gel or the like is impregnated with water, triisobutylaluminum is reacted therewith, and trimethylaluminum is further reacted.

The transition metal compounds represented by general formula (I) or (II) above thus obtained and aluminoxane are allowed to be carried on a fine particulate carrier to obtain the catalyst for olefin (co)polymerization of the present invention.

The fine particulate carrier described above is not limited particularly and may be either an inorganic carrier or an organic carrier so far as it can carry thereon the transition metal compound represented by general formula (I) or (II) above and aluminoxane, and granulate or spherical fine particulate solids which have a particle diameter of 1 to 500 μm, more preferably 5 to 300 μm, are used in the present invention advantageously.

Further, the fine particulate carrier which can be used advantageously in the present invention includes a fine particulate carrier which has a specific surface area on the order of 200 to 700 m²/g, and a pore volume on the order of 1 to 5 cm³/g.

As the fine particulate inorganic carrier, there can be cited oxides and more specifically preferred examples thereof include $SiO_2$, $Al_2O_3$, MgO, $ZrO_2$, $TiO_2$, ZnO, and mixtures of these, for example, $SiO_2-Al_2O_3$, $SiO_2-MgO$, $SiO_2-TiO_2$, $SiO_2-Al_2O_3-Mgo$, etc. Particularly preferred among these are carriers which contain at least one component selected from the group consisting of $SiO_2$, $Al_2O_3$ and MgO as a main component. When producing the catalyst of the present invention, the inorganic oxide carriers are used after calcining usually at 100 to 1,000° C. for 1 to 40 hours. Instead of calcining the above-described inorganic oxide carriers, they can be dehydrated by chemical dehydration process using, for example, $SiCl_4$, chlorosilane or the like.

As the fine particulate organic carrier, there can be cited fine particulate organic polymers, for example, fine particulate polymers such as polyolefins, e.g., polyethylene, polypropylene, poly-1-butene, poly-4-methyl-1-pentene, fine particulate polymer such as polystyrene, etc. They can be produced by conventional processes. Since most of them are commercially available, such commercial products may be used in the present invention. When these fine particulate organic carriers are used in the present invention, calcination treatment or dehydration treatment need not be performed since they are hydrophobic unlike the above-described fine particulate inorganic carriers.

The catalyst for olefin (co)polymerization of the present invention can be obtained by allowing the transition metal compound represented by general formula (I) or (II) above and aluminoxane to carry on the fine particulate carrier as described above. The method of carrying may be a method usually used, for example a method in which the above-described fine particulate carrier, the above-described transition metal compound, and aluminoxane are added to a suitable organic solvent that can dissolve the transition metal compound and aluminoxane, stirred, otherwise operated, and followed by distilling off the organic solvent to have the transition metal compound and aluminoxane carried on the surface of the carrier.

Here, the proportion of the transition metal compound to aluminoxane to be carried on the fine particulate carrier is not limited particularly but may be in a molar ratio of a transition metal compound (as transition metal atom) : aluminoxane (as aluminum atom)=1:1,000 to 1:12, preferably 1:500 to 1:30. The amount of the transition metal compound to be carried on the fine particulate carrier may be 0.01 to 5% by weight, preferably 0.03 to 2% by weight, as a ratio of transition metal carried in the resulting carried type catalyst.

When the above-described transition metal compound and aluminoxane are carried on the fine particulate carrier, if a carrying process is utilized which includes a step of dissolving the transition metal compound and aluminoxane in an organic solvent, then it may happen that the transition metal compound and aluminoxane react and the resulting reaction product is carried on the fine particulate carrier. A fine particulate carrier having carried such a reaction product is also included in the catalyst of the present invention.

That is, the state of the catalyst of the present invention where the above-described transition metal compound and aluminoxane are carried on the fine particulate carrier may be that the both are separately carried on the carrier, that the reaction product between the transition metal compound and aluminoxane is carried on the carrier, or that the transition metal compound, aluminoxane and the reaction product thereof are carried on the carrier in confusion. However, a preferred catalyst of the present invention is in such a state that the reaction product of the above-described transition metal compound and aluminoxane is carried on the fine particulate carrier.

To carry the reaction product between the above-described transition metal compound and aluminoxane on the fine particulate carrier positively, it is sufficient to react the transition metal compound represented by general formula (I) or (II) above with aluminoxane under suitable reaction conditions in the presence of a fine particulate carrier. The temperature at which the transition metal compound and aluminoxane are reacted is usually −20 to 100° C., preferably 0 to 100° C. and the time for reaction is usually at least 0.1 minute, preferably within the range of 1 to 200 minutes.

More specifically, a process is cited in which at first a solution of a transition metal compound in a suitable organic solvent is added to a fine particulate carrier, aluminoxane is added to the mixture and the transition metal compound and aluminoxane are reacted under the above-described preferred reaction conditions. Here, in this process, the order of addition of the transition metal compound and aluminoxane to the fine particulate carrier may be changed freely such that a solution of aluminoxane in a suitable organic solvent is first added to a fine particulate carrier and then a transition metal compound is added.

Addition of a preliminary reaction product from aluminoxane and transition compound dissolved in a suitable organic solvent obtained under suitable reaction conditions to a fine particulate carrier can give rise to the catalyst of the present invention in which the reaction product of the both compounds is carried on the fine particulate carrier.

As described above, when the reaction product of alumioxane and the transition metal compound is carried on a fine particulate carrier, the proportion of the transition metal compound to aluminoxane used in the present invention is made, like the proportion between the transition metal compound and aluminoxane when they are respectively carried on the fine particulate carrier, in a molar ratio, a transition metal compound (as transition metal atom):aluminoxane (as aluminum atom)=1:1,000 to 1:12, preferably 1:500 to 1:30. The amount of the reaction product between the transition metal compound and aluminoxane to be carried on the fine particulate carrier may be 0.01 to 5% by weight, preferably 0.03 to 2% by weight, as a ratio of transition metal carried in the resulting carried type catalyst.

Further, the catalyst of the present invention may include one which comprises a carried type catalyst to which a prepolymer of an olefin is bonded, obtained by adding a small amount of olefin to a carried type catalyst which comprises the fine particulate carrier carrying a transition metal compound and aluminoxane thereon and prepolymerizing the olefin.

The amount of olefin used for prepolymerization is not limited particularly but concretely 0.1 to 100 g, preferably 0.5 to 10 g, per gram of the carried type catalyst. The prepolymer bonded to the resulting carried type catalyst has a weight average molecular weight of 5,000 to 1,000,000, preferably 10,000 to 500,000.

The olefin used for the above-described prepolymerization includes, for example, ethylene, propylene, 1-butene, 1-hexene, 3-methyl-1-butene, 4-methyl-1-pentene, etc. and the prepolymer may be a homopolymer of a single monomer or a copolymer of two or more monomers.

The catalyst for olefin (co)polymerization of the present invention thus obtained can be used in any process for the production of olefin (co)polymers using conventional Zieger series catalysts instead of the Ziegler series catalysts. On this occasion, the catalyst for olefin (co)polymerization of the present invention shows higher polymerization activity than the conventional Ziegler series catalysts.

The catalyst for olefin (co)polymerization of the present invention is used as a catalyst when olefin monomer(s) is or are (co)polymerized. The olefin monomer used as a raw material for olefin (co)polymerization in which the catalyst of the present invention is used, is not limited particularly but olefins having 2 to 12 carbon atoms are cited preferably. Specific examples thereof include ethylene, propylene, 1-butene, 1-pentene, 1-hexene, 1-octene, 1-decene, 4-methyl-1-pentene, 3-methyl-1-pentene, etc. Particularly preferred olefin in the present invention is ethylene. These olefins may be used singly or two or more of them may be used. In some cases, in addition thereto, a small amount of α,ω-diene, such as 1,5-hexadiene and 1,9-decadiene, may be copolymerized. Among the copolymerizations according to the present invention, examples of preferred copolymerizations include copolymerizations between ethylene and at least one of other α-olefins, and particularly preferred copolymerization is a copolymerization between ethylene and 1-hexene.

The catalyst for olefin (co)polymerization of the present invention can exhibit superior effects when used in the process for the production of olefin (co)polymers according to the present invention as described hereinbelow.

(2) Process for the Production of Olefin (co)polymers According to the Present Invention The production process of the present invention is a process in which an olefin or olefins is or are (co) polymerized in the presence of an organoaluminum compound and a catalyst comprising a transition metal compound represented by general formula (I) or (II) above and aluminoxane carried on a fine particulate carrier to produce an olefin (co)polymer.

The catalyst comprising a transition metal compound represented by general formula (I) or (II) above and aluminoxane carried on a fine particulate carrier used in the production process of the present invention may be the same as described in (1) above.

Also, the organoaluminum compound used in the process for the production of olefin (co)polymers according to the present invention is one added to olefin (co)polymerization systems as a scavenger and specifically includes organoaluminum compounds such as triethylaluminum, triisopropylaluminum, triisobutylaluminum, tri-n-butylaluminum, tri-n-hexylaluminum, and diisobutylaluminum hydride. Most preferred among these are triethylaluminum, triisobutylaluminum, etc. These organoaluminum compounds may be used singly or two or more of them may be used simultaneously.

The olefin monomer used in the process for the production of olefin (co)polymers according to the present invention is not limited particularly but olefins having 2 to 12 carbon atoms are used advantageously. Specific examples thereof include ethylene, propylene, 1-butene, 1-pentene, 1-hexene, 1-octene, 1-decene, 4-methyl-1-pentene, 3-methyl-1-pentene, etc. Particularly preferred olefin in the present invention is ethylene. These olefins may be used singly or two or more of them may be used. In some cases, in addition thereto, a small amount of $\alpha,\omega$-diene, such as 1,5-hexadiene and 1,9-decadiene, may be copolymerized. Among the copolymerizations according to the present invention, examples of preferred copolymerizations include copolymerizations between ethylene and at least one of other $\alpha$-olefins, and particularly preferred copolymerization is a copolymerization between ethylene and 1-hexene.

According to the production process of the present invention, it can be produced a ethylene/1-hexene copolymer advantageously wherein the content of 1-hexene is 0.1 to 10 mol %, preferably 0.1 to 5 mol %, more preferably 0.1 to 2 mol %.

In the production process of the present invention, even thought the ethylene/1-hexene copolymer contains a considerable amount of 1-hexene as described above, the properties of a high molecular weight and a narrow molecular weight distribution, which an ethylene homopolymer has, are kept in high level. Functional structure of the (co) polymerization when the production process of the present invention is used is not made clear, but it is thought that a length of a crosslinking group, a ring structure and the like in the transition metal compound represented by general formula (I) or (II) are influenced with each other and as a result the above described effects are appeared.

The density of ethylene/1-hexene copolymer obtained with production process of the present invention is usually not more than 0.950 g/cm$^3$, preferably 0.900 to 0.950 g/cm$^3$, more preferably 0.900 to 0.940 g/cm$^3$, further more preferably 0.900 to 0.930 g/cm$^3$.

As the process for the production of olefin (co)polymers according to the present invention, there can be used a process for producing olefin (co)polymers by (co) polymerizing olefin(s) in the presence of a Ziegler series catalyst and an organoaluminum, in which a known Ziegler series catalyst and organoaluminum are used provided that as the Ziegler series catalyst is used a catalyst comprising a transition metal compound represented by general formula (I) or (II) above and aluminoxane carried on a fine particulate carrier. More specifically, a slurry polymerization process in which propylene is polymerized in an inert solvent, for example, an aliphatic hydrocarbon such as butane, pentane, hexane, heptane, and isooctane; an alicyclic hydrocarbon such as cyclopentane, cyclohexane, and methylcyclohexane; an aromatic hydrocarbon such as toluene, xylene, and ethylbenzene; gasoline fraction; hydrogenated Diesel oil fraction; or the like, a bulk (co)polymerization process in which the monomer itself is used as a solvent, a gaseous phase (co)polymerization process in which the polymerization is carried out in a gaseous phase, a solution (co) polymerization process in which the resulting olefin (co) polymer after the polymerization is liquid, or (co) polymerization processes combining two or more of these processes may be used.

The time and form of addition of the catalyst and organoaluminum in each of the (co)polymerization processes as described above may be the same as the case where the conventional Ziegler series catalysts are used. That is, no limitation is posed on their form of use of the catalyst and organoaluminum so far as the catalyst comprising a transition metal compound represented by general formula (I) or (II) above and aluminoxane carried on a fine particulate carrier and an organoaluminum are combined and used in the respective (co)polymerization processes. For example, the above-described catalyst and organoaluminum compound may be added to the olefin (co)polymerization system simultaneously or separately, or after preliminary mixing and preparation.

As for the timing of addition, the both compounds may be added to the olefin (co)polymerization system simultaneously in the (co)polymerization process. Alternatively, they may be added in separate steps, respectively. When they are added separately in different steps of the (co) polymerization process, the order of addition is not important. However, it is preferred that the organoaluminum compound is first added to the olefin (co)polymerization system and then the catalyst comprising a transition metal compound represented by general formula (I) or (II) above and aluminoxane carried on a fine particulate carrier is added.

The amount of the above-described catalyst used in the process for the production of olefin (co)polymers according to the present invention is not limited particularly so far as it is present in an amount sufficient for catalyzing the olefin (co)polymerization. More particularly, it may be added in an amount of $10^{-8}$ to $10^{-4}$ mole/L, preferably $10^{-7}$ to $10^{-5}$ mole/L as concentration of a transition metal compound in the (co)polymerization reaction system.

The amount of the organoaluminum used in the process for the production of olefin (co)polymers according to the present invention is not limited particularly so far as it is present in an amount sufficient for acting as a scavenger in the olefin (co)polymerization system but may be in molar ratio of the amount of the above-described catalyst to the amount of organoaluminum to be added of a transition compound:organoaluminum compound =1:1,000 to 1:12, preferably 1:500 to 1:30.

As the polymerization conditions, there may usually be used those polymerization conditions similar to those of olefin (co)polymerizations using conventional Ziegler series catalysts. That is, although the polymerization conditions depend on olefin monomers and polymerization processes and the like used, the polymerization temperature is −50 to 150° C., preferably −10 to 100° C., more preferably 40 to 80° C. and the polymerization pressure is atmospheric pressure to 7 MPa, preferably 0.2 MPa to 5 MPa. The polymerization time is usually 1 minute to 20 hours. The molecular weight control of the resulting olefin (co) polymers is achieved by introduction of hydrogen as a molecular weight regulator into the polymerization system as well as the selection of the above-described polymerization conditions.

After completion of the olefin (co)polymerization, post-treatments such as known catalyst deactivation treatment step, catalyst residue removing step, and drying step are conducted if desired, before the olefin (co)polymers can be obtained.

The olefin (co)polymers, especially ethylene/1-hexene copolymer, obtained by the production process of the present invention as described above are polymers which have a high molecular weight and a narrow molecular weight distribution. The olefin (co)polymers obtained by the present invention may contain various additives such as antioxidants, ultraviolet absorbents, antistatic agents, nucleating agents, lubricants, flame retardants, antiblocking agents, colorants, inorganic and organic fillers, and further various synthetic resins so far as they do not deteriorate the physical properties of the olefin (co)polymers. Usually, they are heat molten and kneaded and provided in the form of pellets as being cut to granules for the production of injection molded articles or the like.

EXAMPLES

Hereafter, the present invention will be described in more detail by examples and comparative examples.

In the examples and comparative examples, the definition of terms and measurement methods are as described below.

Intrinsic viscosity [η]: Measured in a decaline solution at 135° C. using an Uberode type viscometer.

1-Hexene content: Obtained from characteristic absorptions of ethylene and α-olefin using $^{13}$C-NMR.

Molecular weight: Mw/Mn was calculated based on the results of measurement by gel permeation chromatography (GPC) by the following method. That is, using an o-dichlorobenzene solution with a polymer concentration of 0.05% by weight and a mixed polystyrene gel column (for example, PSK gel GMH6-HT, manufactured by Tosoh), measurement was made at 135° C. As the measuring apparatus, for example, GPC-150C (manufactured by Waters) may be used.

Example 1

Preparation of Catalyst and Polymerization of Ethylene (1) Preparation of Catalyst
(i) Synthesis of transition metal compound (metallocene compound): {[η-$C_5H_5ZrCl_2$][μ-η-$C_5H_4$—$SiMe_2$-η-$C_9H_6$][η-$C_5H_5ZrCl_2$]} (hereafter, referred to as "metallocene compound (1)")

1.5 g of $Li_2[SiMe_2(C_5H_4)(C_9H_6)]\cdot 0.6Et_2O$ (5.1 mmol) prepared by the method described in New. J. Chem. 14, 499 (1990) and 3.62 g of $[Zr(\eta\text{-}C_5H_5)Cl_3]\cdot DME$ (10.3 mmol) prepared by the method described in Organometallics, 9, 2426 (1990) were mixed in 70 cm$^3$ of toluene and refluxed for 17 hours. The reaction mixture was filtered to remove impurities and then toluene, the solvent, was distilled off from the filtrate. Thereafter, recrystallization of the resulting solids from dichloromethane/pentane mixture afforded 1.5 g (yield: 42.6%) of metallocene compound (1).

(ii) Production of carried type catalyst 0.3 g of silica calcined in a nitrogen atmosphere at 200° C. for 4 hours (Grade P-10 manufactured by Fuji Silicia, specific surface area: 292 m$^2$/g; pore volume: 1.56 cm$^3$/g) was suspended in 10 ml of toluene and cooled to 0° C. While stirring, 5 ml of a toluene solution of methylaluminoxane (manufactured by Witco, 0.9 mol/l as Al atom) was dripped to the suspension gradually and then while keeping the temperature at 0° C., stirring was continued for additional 1 hour. Then, the suspension was warmed up to the room temperature and 15 ml of the toluene solution of metallocene compound (1) (1.4 mmol/l as Zr atom) prepared in (i) above was added thereto. The suspension was warmed up to 80° C. and then allowed to react at the same temperature for 1 hour.

Thereafter, the reaction mixture was allowed to stand for a while, it separated into a supernatant and precipitates. After the supernatant was removed, the precipitates were washed with toluene twice. Then, substitution of the solvent by n-hexane afforded a carried type catalyst containing 6.0 mg of zirconium per gram of silica (hereafter, referred to as "carried type catalyst (S-1)").

(2) Polymerization of Ethylene 300 ml of n-hexane and 0.5 mmol of triisobutylaluminum were charged in an autoclave of an inner volume of 800 ml which sufficiently nitrogen purged and the temperature inside the system was elevated to 40° C. Then, the carried type catalyst (S-1) prepared in (1) above was added in an amount of 5.0 mg as silica and the temperature was elevated to 70° C. and ethylene was fed to start polymerization.

While feeding ethylene continuously so that the ethylene partial pressure was 7.5 kg/cm$^2$, the polymerization was continued for 1 hour, followed by addition of a small amount of methanol to stop the polymerization. Purification and drying of the resulting polymer gave 11 g of polyethylene. The catalyst activity was 2.2 kg polymer/g silica. Measurement of the intrinsic viscosity of the polymer showed a very high value of 5.5 dl/g. The polymer had an Mw/Mn of 2.3 and a density of 0.946 g/cm$^3$.

Example 2

Copolymerization of Ethylene and 1-hexene 300 ml of n-hexane, 3.4 g of 1-hexene, and 0.5 mmol of triisobutylaluminum were charged in an autoclave of an inner volume of 800 ml which sufficiently nitrogen purged and the temperature inside the system was elevated to 40° C. Then, the carried type catalyst (S-1) prepared in Example 1 above was added in an amount of 5.5 mg as silica and the temperature was elevated to 70° C. and ethylene was fed to start polymerization.

While feeding ethylene continuously so that the ethylene partial pressure was 7.5 kg/cm$^2$, the polymerization was continued for 1 hour, followed by addition of a small amount of methanol to stop the polymerization. Purification and drying of the resulting polymer gave 21 g of ethylene/1-hexene copolymer. The catalyst activity was 3.8 kg copolymer/g silica, which was higher than that obtained in Example 1. Measurement of the comonomer content in the copolymer showed 0.4 mol %. Measurement of the intrinsic viscosity of the copolymer showed a value of 5.0 dl/g. The copolymer had an Mw/Mn of 2.4 and a density of 0.932 g/cm$^3$.

Example 3

Copolymerization of Ethylene and 1-hexene

Copolymerization of ethylene and 1-hexene was carried out in the same manner as in Example 2 except that in Example 2, the amount of 1-hexene was increased to 6.7 g and the amount of the carried type catalyst (S-1) was increased to 10 mg as silica. As a result, 22 g of ethylene/1-hexene copolymer was obtained. The catalyst activity was 2.2 kg copolymer/g silica. Measurement of the comonomer content in the copolymer showed 1.2 mol %. Measurement of the intrinsic viscosity of the copolymer showed a value of 4.8 dl/g. The copolymer had an Mw/Mn of 2.3 and a density of 0.926 g/cm$^3$.

Example 4

Preparation of Catalyst and Polymerization of Ethylene (1) Preparation of Catalyst (i) Synthesis of transition metal compound (metallocene compound) {[η-$C_5H_5ZrCl_2$][μ-η-$C_9H_6$—$SiMe_2$-η-$C_9H_6$][η-$C_5H_5ZrCl_2$]} (hereafter, referred to as "metallocene compound (2)")

2.0 g of $Li_2[SiMe_2(C_9H_6)_2] \cdot 0.5Et_2O$ (5.93 mmol) prepared by the method described in orgnometallics, 12, 4607 (1993) and 4.2 g of [Zr(η-$C_5H_5$)$Cl_3$]·DME (11.9 mmol) prepared by the method described in organometallics, 9, 2426 (1990) were mixed in 70 cm$^3$ of toluene and refluxed for 17 hours. The reaction mixture was filtered to remove impurities and then toluene, the solvent, was distilled off from the filtrate. After the obtained solids was extracted with toluene at 80° C., distilling off toluene afforded 0.85 g (yield: 19.5%) of metallocene compound (2) as a racemi form.

(ii) Production of carried type catalyst 0.3 g of silica calcined in a nitrogen atmosphere at 200° C. for 4 hours (Grade P-10 manufactured by Fuji Silicia, specific surface area: 292 m$^2$/g; pore volume: 1.56 cm$^3$/g) was suspended in 10 ml of toluene and cooled to 0° C. While stirring, 5 ml of a toluene solution of methylaluminoxane (manufactured by Witco, 0.9 mol/l as Al atom) was dripped to the suspension gradually and while keeping the temperature at 0° C., stirring was continued for additional 1 hour. Then, the suspension was warmed up to the room temperature and 15 ml of the toluene solution of metallocene compound (2) (1.4 mmol/l as Zr atom) prepared in (i) above was added thereto. The suspension was warmed up to 80° C. and then allowed to react at the same temperature for 1 hour.

Thereafter, the reaction mixture was allowed to stand for a while and it separated into a supernatant and precipitates. After the supernatant was removed, the precipitates were washed with toluene twice. Then, substitution of the solvent by n-hexane afforded a carried type catalyst containing 5.8 mg of zirconium per gram of silica (hereafter, referred to as "carried type catalyst (S-2)").

(2) Polymerization of Ethylene 300 ml of n-hexane and 0.5 mmol of triisobutylaluminum were charged in an autoclave of an inner volume of 800 ml which sufficiently nitrogen purged and the temperature inside the system was elevated to 40° C. Then, the carried type catalyst (S-2) prepared in (1) above was added in an amount of 5.0 mg as silica and the temperature was elevated to 70° C. and ethylene was fed to start polymerization.

While feeding ethylene continuously so that the ethylene partial pressure was 7.5 kg/cm$^2$, the polymerization was continued for 1 hour, followed by addition of a small amount of methanol to stop the polymerization. Purification and drying of the resulting polymer gave 15 g of polyethylene. The catalyst activity was 3.0 kg polymer/g silica. Measurement of the intrinsic viscosity of the polymer showed a very high value of 5.3 dl/g. The polymer had an Mw/Mn of 2.4 and a density of 0.950 g/cm$^3$.

Example 5

Copolymerization of Ethylene and 1-hexene 300 ml of n-hexane, 3.4 g of 1-hexene, and 0.5 mmol of triisobutylaluminum were charged in an autoclave of an inner volume of 800 ml which sufficiently nitrogen purged and the temperature inside the system was elevated to 40° C. Then, the carried type catalyst (S-2) prepared in Example 4 above was added in an amount of 5.5 mg as silica and the temperature was elevated to 70° C. and ethylene was fed to start polymerization.

While feeding ethylene continuously so that the ethylene partial pressure was 7.5 kg/cm$^2$, the polymerization was continued for 1 hour, followed by addition of a small amount of methanol to stop to polymerization. Purification and drying of the resulting polymer gave 21 g of ethylene/1-hexene copolymer. The catalyst activity was 3.8 kg copolymer/g silica. Measurement of the comonomer content in the copolymer showed 0.42 mol %. Measurement of the intrinsic viscosity of the copolymer showed a value of 5.0 dl/g. The copolymer had an Mw/Mn of 2.4 and a density of 0.931 g/cm$^3$.

Example 6

Copolymerization of Ethylene and 1-hexene

Copolymerization of ethylene and 1-hexene was carried out in the same manner as in Example 5 except that in Example 5, the amount of 1-hexene was increased to 6.7 g and the amount of the carried type catalyst (S-2) was increased to 10 mg as silica. As a result, 22 g of ethylene/1-hexene copolymer was obtained. The catalyst activity was 2.2 kg copolymer/g silica. Measurement of the comonomer content in the copolymer showed 1.3 mol %. Measurement of the intrinsic viscosity of the copolymer showed a value of 4.8 dl/g. The copolymer had an Mw/Mn of 2.3 and a density of 0.927 g/cm$^3$.

Example 7

Preparation of Catalyst and Polymerization of Ethylene (1) Preparation of Catalyst (i) Synthesis of transition metal compound (metallocene compound): {[η-$C_5H_5ZrCl_2$][μ-η-$C_5H_4$—$SiMe_2$—$CH_2$—$CH_2$—$SiMe_2$-η-$C_5H_4$][η-$C_5H_5ZrCl_2$]} (hereafter, referred to as "metallocene compound (3)").

0.16 g of $Li_2[SiMe_2CH_2CH_2SiMe_2(C_5H_4)_2]$ (0.56 mmol) prepared by the method described in Orgnometallics, 10, 347 (1991) and 0.4 g of [Zr(η-$C_5H_5$)$Cl_3$]·DME (1.12 mmol) prepared by the method described in Organometallics, 9, 2426 (1990) were mixed in 30 cm$^3$ of toluene and refluxed for 17 hours. The reaction mixture was filtered to remove impurities and then toluene, the solvent, was distilled off from the filtrate. Then, dichloromethane-soluble components were extracted from the obtained solids. Concentration of the dichloromethane solution afforded 0.19 g (yield: 46.7%) of metallocene compound (3). The metallocene compound (3) was stored at −20° C. till use.

(ii) Production of carried type catalyst 0.3 g of silica calcined in a nitrogen atmosphere at 200° C. for 4 hours (Grade P-10 manufactured by Fuji Silicia, specific surface area: 292 m$^2$/g; pore volume: 1.56 cm$^3$/g) was suspended in 10 ml of toluene and cooled to 0° C. While stirring, 5 ml of a toluene solution of methylaluminoxane (manufactured by Witco, 0.9 mol/l as Al atom) was dripped to the suspension gradually and while keeping the temperature at 0° C., stirring was continued for additional 1 hour. Then, the suspension was warmed up to the room temperature and 15 ml of the toluene solution of metallocene compound (3) (1.4 mmol/l as Zr atom) prepared in (i) above was added thereto. The suspension was warmed up to 80° C. and then allowed to react at the same temperature for 1 hour.

Thereafter, the reaction mixture was allowed to stand for a while and it separated into a supernatant and precipitates. After the supernatant was removed, the precipitates were washed with toluene twice. Then, substitution of the solvent by n-hexane afforded a carried type catalyst containing 5.8 mg of zirconium per gram of silica (hereafter, referred to as "carried type catalyst (S-3)").

(2) Polymerization of Ethylene 300 ml of n-hexane and 0.5 mmol of triisobutylaluminum were charged in an autoclave of an inner volume of 800 ml which sufficiently nitrogen purged and the temperature inside the system was elevated to 40° C. Then, the carried type catalyst (S-3) prepared in (1) above was added in an amount of 5.0 mg as silica and the temperature was elevated to 70° C. and ethylene was fed to start polymerization.

While feeding ethylene continuously so that the ethylene partial pressure was 7.5 kg/cm$^2$, the polymerization was continued for 1 hour, followed by addition of a small amount of methanol to stop the polymerization. Purification and drying of the resulting polymer gave 12 g of polyethylene. The catalyst activity was 2.4 kg polymer/g silica. Measurement of the intrinsic viscosity of the polymer showed a very high value of 5.0 dl/g. The polymer had an Mw/Mn of 2.2 and a density of 0.948 g/cm$^3$.

Example 8

Copolymerization of Ethylene and 1-hexene 300 ml of n-hexane, 3.4 g of 1-hexene, and 0.5 mmol of triisobutylaluminum were charged in an autoclave of an inner volume of 800 ml which sufficiently nitrogen purged and the temperature inside the system was elevated to 40° C. Then, the carried type catalyst (S-3) prepared in Example 7 above was added in an amount of 5.5 mg as silica and the temperature was elevated to 70° C. and ethylene was fed to start polymerization.

While feeding ethylene continuously so that the ethylene partial pressure was 7.5 kg/cm$^2$, the polymerization was continued for 1 hour, followed by addition of a small amount of methanol to stop to polymerization. Purification and drying of the resulting polymer gave 25 g of ethylene/1-hexene copolymer. The catalyst activity was 4.5 kg copolymer/g silica. Measurement of the comonomer content in the copolymer showed 0.42 mol %. Measurement of the intrinsic viscosity of the copolymer showed a value of 4.8 dl/g. The copolymer had an Mw/Mn of 2.3 and a density of 0.930 g/cm$^3$.

Example 9

Copolymerization of Ethylene and 1-hexene

Copolymerization of ethylene and 1-hexene was carried out in the same manner as in Example 8 except that in Example 8, the amount of 1-hexene was increased to 6.7 g and the amount of the carried type catalyst (S-3) was increased to 10 mg as silica. As a result, 26 g of ethylene/1-hexene copolymer was obtained. The catalyst activity was 2.6 kg copolymer/g silica. Measurement of the comonomer content in the copolymer showed 1.3 mol %. Measurement of the intrinsic viscosity of the copolymer showed a value of 4.6 dl/g. The copolymer had an Mw/Mn of 2.3 and a density of 0.922 g/cm$^3$.

Comparative Example 1

Preparation of Catalyst and Polymerization of Ethylene (1) Production of Carried Type Catalyst The procedures of Example 1 above were repeated except that instead of metallocene compound (1), biscyclopentadienylzirconium dichloride was used to obtain a carried type catalyst containing 6.2 mg of zirconium per gram of silica (hereafter referred to as "carried type catalyst (S-4)".

(2) Polymerization of Ethylene

Polymerization of ethylene was carried out in the same manner as in Example 1 except that instead of carried type catalyst (S-1), the above-described carried type catalyst (S-4) was used in an amount of 28.2 mg as silica. As a result, 16.9 g of polyethylene was obtained. The catalyst activity was a low value of 0.6 kg polymer/g silica. Measurement of the intrinsic viscosity of the polymer showed a value of 3.50 dl/g. The polymer had an Mw/Mn of 2.3 and a density of 0.950 g/cm$^3$.

Comparative Example 2

Copolymerization of Ethylene and 1-hexene

Copolymerization of ethylene and 1-hexene was carried out in the same manner as in Example 2 except that instead of the carried type catalyst (S-1), the carried type catalyst (S-4) was used in an amount of 28.2 mg as silica. As a result, 11.5 g of ethylene/1-hexene copolymer was obtained. The catalyst activity was 0.4 kg copolymer/g silica. The content of 1-hexene in the copolymer was 0.63 mol %. Measurement of the intrinsic viscosity of the copolymer showed a value of 1.91 dl/g. The copolymer had an Mw/Mn of 2.6 and a density of 0.932 g/cm$^3$.

What is claimed is:

1. A process for olefin copolymerization by copolymerizing ethylene and at least one of other α-olefin in the presence of a catalyst and an organoaluminum compound, in which the catalyst is a catalyst comprising a transition metal compound represented by general formula below and aluminoxane carried on a fine particulate carrier:

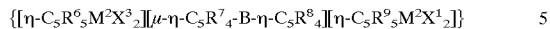

wherein, $\eta\text{-}C_5R^6{}_5$, $\eta\text{-}C_5R^7{}_4$, $\eta\text{-}C_5R^8{}_4$, and $\eta\text{-}C_5R^9{}_5$ represent substituted cyclopentadienyl groups respectively;

each of $R^6$, $R^7$, $R^8$, and $R^9$ independently represents a hydrogen atom or a hydrocarbon group having 1 to 20 carbon atoms which may contain a silicon atom, all of $R^6$, $R^7$, $R^8$, and $R^9$ may be the same or different, respectively, and any two adjacent $R^6$, $R^7$, $R^8$, and $R^9$ may be combined to form at least one hydrocarbon ring which may contain a silicon atom around the cyclopentadienyl ring, respectively;

B is a crosslinking group consisting of a hydrocarbon containing a silicon atom, its backbone chain containing at least one silicon atom and its chain length being 2 to 20 atoms;

$M^2$ represents transition metals selected from the group consisting of titanium, zirconium and hafnium, respectively;

each of $X^3$ and $X^4$ independently represents a hydrogen atom, a halogen atom or hydrocarbon group having 1 to 20 carbon atoms.

2. The process as claimed in claim 1, wherein the copolymerization is of ethylene and 1-hexene.

* * * * *